(No Model.)
A. HOFFMANN.
WASHING MACHINE.
No. 245,300. Patented Aug. 9, 1881.
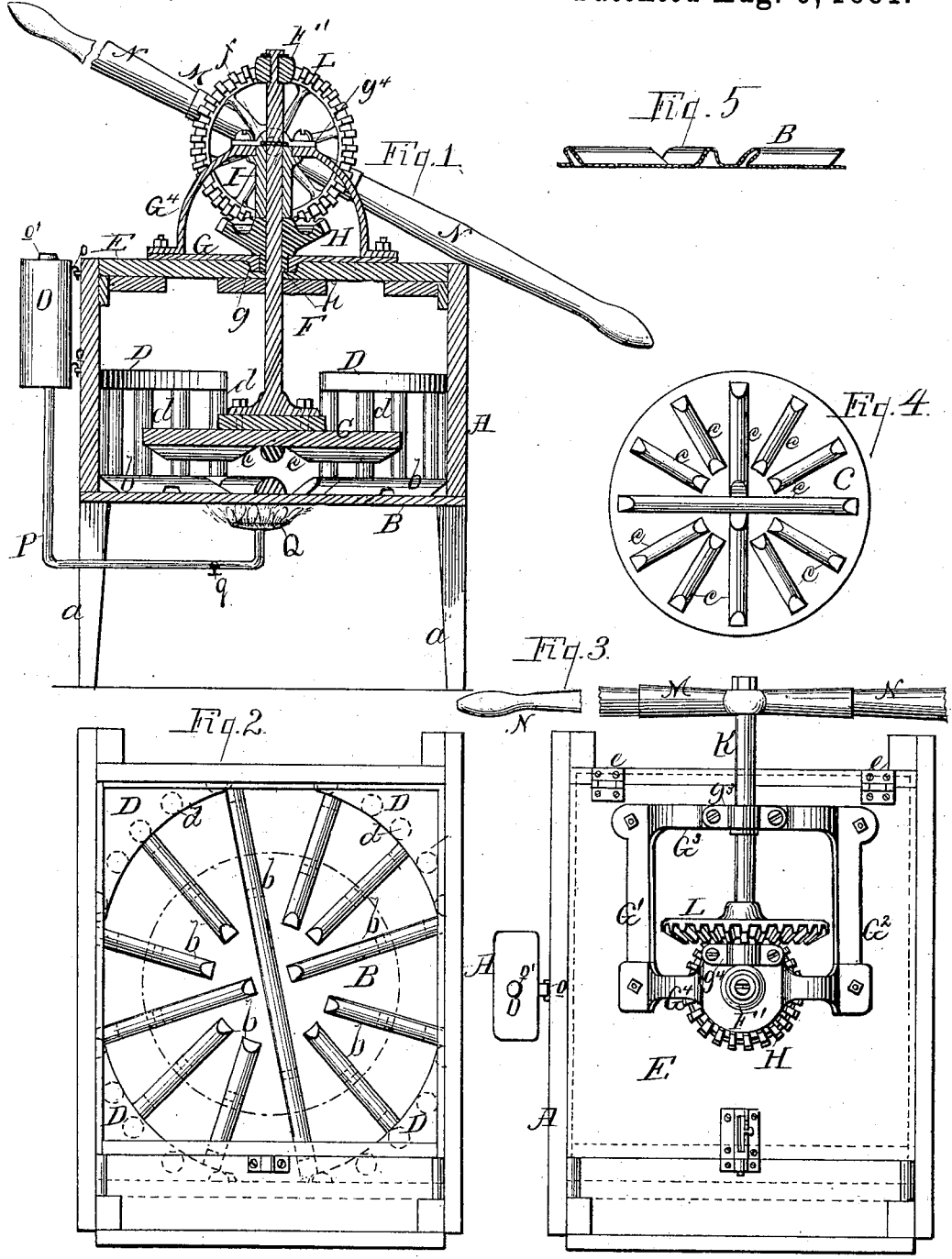
Witnesses:
E. G. Asmus
J. C. Peck
Inventor
Adolph Hoffmann
by Stout & Underwood
Attorneys.

UNITED STATES PATENT OFFICE.

ADOLPH HOFFMANN, OF MILWAUKEE, WISCONSIN.

WASHING-MACHINE.

SPECIFICATION forming part of Letters Patent No. 245,300, dated August 9, 1881.

Application filed May 11, 1881. (No model.)

*To all whom it may concern:*

Be it known that I, ADOLPH HOFFMANN, of Milwaukee, in the county of Milwaukee, and in the State of Wisconsin, have invented certain new and useful Improvements in Washing-Machines; and I do hereby declare that the following is a full, clear, and exact description thereof.

My invention consists of a new and improved washing-machine, together with certain improvements in the gearing and in the means for heating the suds in the box, all as more fully set forth hereinafter.

In the drawings, Figure 1 represents the entire machine, in vertical cross-section, and with the heating device attached thereto. Fig. 2 is a plan view of the wash-box with the cover and the operating mechanism connected therewith removed. Fig. 3 is a plan view of the entire machine, and Figs. 4 and 5 are details.

The wash-box A, preferably oblong in shape, is made in the ordinary manner, with the exception of the bottom B, which I prefer to make of metal, while the balance of the wash-box is ordinarily made of wood, although all may be made of metal, or such parts as are made of wood may be lined or covered with metal, as desired. This bottom B may be either cast solid and galvanized, as shown in Fig. 1, or pressed out of a stout sheet of zinc, as shown in Fig. 5, half-round ribs $b\ b$ being formed upon its upper surface, arranged radially, as shown. The wash-box is elevated to a suitable height above the floor by legs $a\ a$, as usual, and inside the box each corner is filled with the sections D, consisting of upper and lower plates, having between them vertical round rods $d\ d$, arranged in the line of an ellipse over the oblong bottom. The said rods are arranged in the plate so as to be capable of revolution, and thus greatly assist in the cleansing of the materials to be washed.

E is the cover of the machine, hinged at $e\ e$, as shown. This cover supports the rubber C and the entire operating mechanism. The rubber C is made of a stout wooden disk provided on its under side with half-round ribs $c\ c$, corresponding to the ribs $b\ b$ on the bottom of the wash-box.

To the rubber C is securely bolted the lower end of a straight shank, F, which is made square in cross-section, and moves in square bearings in the operating mechanism, but passes through a round hole in the cover to permit of the rubber C being freely revolved.

The cover E is recessed at its center to receive the downward projection $g$ of the plate G, which projection is perforated to receive the hub $h$ of the horizontal bevel-gear H, and this hub $h$ is, in turn, pierced with a square hole to receive the squared shank F of the rubber C. The hub $h$ extends upward above the level of the cogs on the gear, and serves as a support to the sleeve I, also perforated with a square hole fitting the squared shank F. The plate G has two flat plates, G' and $G^2$, extending backward toward the hinged end of the cover, and united at their rear ends by the arched plate $G^3$, the whole device G G' $G^2$ $G^3$ being preferably cast solid in one piece. Above and to the front plate, G, a second arched plate, $G^4$, is secured by bolts, the top of this arch being perforated and fitting over the sleeve I, resting on a shoulder formed on said sleeve, as clearly shown in Fig. 1. These two arched plates $G^3$ and $G^4$ serve to support the crank-shaft K, which carries the handle-sockets M at one end and the vertical bevel-gear L at the other, the crank-shaft being held in place over each arched plate by the caps $g^3$ and $g^4$ and bolts and nuts of ordinary construction.

The shank F is provided with a pin or projection, $f$, just above the top of the arched plate $G^4$, to keep the rubber C at a certain height above the bottom B of the wash-box when the machine is not in use, and to limit its downward play, and has a knob or handle, F', to grasp in raising the shank when it is desired to open the cover. This handle F' can be weighted, if desired; but I prefer to make the rubber C sufficiently heavy to bear with considerable pressure upon the mass of clothing beneath it. The wash-box is provided with a stop-cock of ordinary construction to draw off the suds and dirty water when the machine is to be emptied.

The operation of my device is extremely simple. In order to open the cover it is necessary to lift the rubber C to the top of the box by means of the shank-handle F', when the cover (with the mechanism attached thereto) can be turned back on the hinges $e\ e$, and the water and soiled clothes put into the wash-box, the cover replaced in proper position, and the rubber C reciprocated by operating the handles N of the machine, the rubber C and shank F rising to a height commensurate with the quantity of clothing in the wash-box, yet always bearing down with considerable pressure upon the clothing, as described.

Where hot water is poured into the wash-box my device will work equally well with a wooden bottom, (covered with zinc or not, as desired;) but for greater convenience I have designed the metal bottom first described to serve in this manner.

In many instances it is not convenient to boil water separately and pour it into the wash-box, nor to boil the clothes separately in a wash-boiler before washing them, and with a metal bottom this is unnecessary. I construct a simple reservoir, O, of sheet-tin or other suitable material, and attach it by hooks $o$ to the top edge or side of the wash-box. From the bottom of this reservoir a pipe, P, extends down and under the wash-box, being bent at an angle, as shown, and terminating in a burner, Q, perforated in its top with a number of minute holes, and provided with a stop, $q$. A suitable fluid (such as naphtha or alcohol) is supplied to the reservoir through the mouth $o'$, (which is kept covered by an ordinary screw-cap,) and the pipe P is supplied with wicking or other suitable absorbent to prevent the liquid from being supplied too freely to the burner.

With this device cold water may be poured into the wash-box along with the soiled clothing and the burner lighted. In a very few minutes the water will boil in the wash-box, when the light can be extinguished and the reservoir, &c., unhooked from the wash-box and put away, to be again used whenever the water gets too cold to properly cleanse the clothing, or it may be used continuously during the process of washing, as is preferred.

I am aware that I am not the first to suspend a corrugated or ribbed rubber within a wash-box from the cover thereof and to operate the same by means of bevel-gearing and a crank-shaft supported by arched plates, and such I do not broadly claim; nor am I the first to provide washing-machines with corrugated metal bottoms; nor the first to attach a heating device to a washing-machine, whereby the suds may be boiled directly in the wash-box, and to such constructions broadly I lay no claim; but

Having thus described my invention, what I claim as new, and desire to secure by Letters Patent, is—

1. The wash-box A, provided with metal bottom B, having half-round ribs, radially disposed, and corner-sections D, consisting of upper and lower plates, having vertical rods $d\ d$, adapted to revolve in their bearings, substantially as described.

2. The combination of the plate G with projection $g$, flat plates $G'\ G^2$, arched plates $G^3\ G^4$, crank-shaft K, vertical bevel-gear L, horizontal bevel-gear H, with hub $h$, sleeve I, and squared shank F, as set forth.

3. The combination of the wash-box A, having four corner-sections D, consisting of upper and lower plates, with vertical revolving rollers between said plates, these rollers being arranged about the wash-box in the line of an ellipse, and half-round ribs radially disposed within said ellipse upon the bottom of the wash-box, with the circular rubber C, provided on its under surface with radially-disposed half-round ribs, and adapted to move vertically and in the line of a circle, as shown and described.

In testimony that I claim the foregoing I have hereunto set my hand this 28th day of April, 1881.

ADOLPH HOFFMANN.

Witnesses:
STANLEY S. STOUT,
HAROLD G. UNDERWOOD.